United States Patent Office.

HENRY BOWER, OF PHILADELPHIA, PENNSYLVANIA.

*Letters Patent No. 86,275, dated January 26, 1869.*

IMPROVED PROCESS OF TREATING INSOLUBLE PHOSPHATES.

The Schedule referred to in these Letters Patent and making part of the same.

*To all whom it may concern:*

Be it known that I, HENRY BOWER, of Philadelphia, Pennsylvania, have invented an Improved Process of Treating Insoluble Phosphatic Substances; and I do hereby declare the following to be a full, clear, and exact description of the same.

My invention consists in subjecting hard or rock-guano to the combined action of air and sea-water, substantially in the manner described hereafter, so as to render it more available for fertilizing-purposes.

In order to enable others to practise my invention, I will now proceed to describe a mode of carrying the same into effect.

My invention relates to the treatment of phosphatic substances, such as are generally known as rock or hard guano, as, for instance, the guano sent to market from the Caribbean seas, and termed Navassa guano, Sombrero guano, Swan-Island guano, &c.; or such material as the petrified remains and excrement of animals found near Charleston, South Carolina; or such substances as coprolite, found in England and other countries; or such minerals as osteolite and apatite, or any other material in which phosphate of lime exists in an insoluble form.

I select, for my treatment of these materials, a locality near the sea-shore, or where a plentiful supply of sea-water can be readily obtained; and the more exposed to winds and storms the locality is, the better is it adapted to the treatment which I will now describe.

Having selected a suitable spot for the process, I form beds of the guano, which has been previously ground as fine as possible, and these beds should be about a foot thick, and under such cover that, while protected from the rain, they are well exposed to the wind and influence of the air.

From time to time, I turn the pasty mass, to which the beds are reduced by the sea-water, and this turning may be accomplished by a plow or other like instrument, the operation being repeated whenever the mass becomes sufficiently dry to receive additional sprinklings of sea-water, which may be accomplished by a force-pump and hose, or other suitable appliances.

This treatment is continued until the guano is well impregnated with the solid matter of the sea-water, or so as to produce a proper decomposition of the guano, and to give it the proper amount of alkaline salts—a result which will occupy about a year's practice of the process to accomplish.

The effect of the treatment is to render a portion of the phosphates soluble, and the guano more valuable for fertilizing-purposes, a portion of phosphoric acid combining with the various salts of sodium, potassium, and magnesium which exist in sea-water, and are most valuable fertilizing-salts.

The other portions of the guano are improved mechanically, as they are more thoroughly disintegrated than by any process of grinding, the alternate freezing and thawing in the winter-season aiding much in accomplishing this desirable result.

The mechanical admixture of the salts of sodium, potassium, and magnesium, also add much to the value of the guano as fertilizing-agents.

It is preferable to arrange the covers for the beds of guano to be movable, so that, in hot and dry weather, the covers may be removed, and the beds exposed to heat, which facilitates the process.

The more exposed the situation is to strong and constant winds, the more rapid are the above processes of disintegration and impregnation.

I claim as my invention, and desire to secure by Letters Patent—

The treatment of insoluble phosphatic substances, by subjecting them to the combined action of sea-water and the atmosphere, substantially as and for the purpose described.

In testimony whereof, I have signed my name to this specification, in the presence of two subscribing witnesses.

HENRY BOWER.

Witnesses:
JOHN WHITE,
WM. A. STEEL.